(12) United States Patent
Wang

(10) Patent No.: US 11,164,573 B2
(45) Date of Patent: Nov. 2, 2021

(54) METHOD AND APPARATUS FOR CONTROLLING PAGE

(71) Applicant: Baidu Online Network Technology (Beijing) Co., Ltd., Beijing (CN)

(72) Inventor: Wenyu Wang, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 544 days.

(21) Appl. No.: 16/133,344

(22) Filed: Sep. 17, 2018

(65) Prior Publication Data

US 2019/0164549 A1 May 30, 2019

(30) Foreign Application Priority Data

Nov. 30, 2017 (CN) .......................... 201711237766.1

(51) Int. Cl.
| | |
|---|---|
| G10L 15/22 | (2006.01) |
| G10L 15/26 | (2006.01) |
| G06F 16/33 | (2019.01) |
| G06F 3/16 | (2006.01) |
| G06K 9/62 | (2006.01) |
| G06N 20/00 | (2019.01) |

(52) U.S. Cl.
CPC .............. G10L 15/22 (2013.01); G06F 3/167 (2013.01); G06F 16/3334 (2019.01); G06K 9/6256 (2013.01); G06N 20/00 (2019.01); G10L 15/26 (2013.01); *G10L 2015/223* (2013.01); *G10L 2015/225* (2013.01)

(58) Field of Classification Search
CPC ... G10L 15/22; G10L 15/26; G10L 2015/225; G10L 2015/223; G10L 15/063; G10L 15/187; G06N 20/00; G06N 3/0454; G06N 3/08; G06K 9/6256; G06F 40/58; G06F 3/167; G06F 16/3334; G06F 3/0481
USPC ........................................................ 704/200
See application file for complete search history.

(56) References Cited

U.S. PATENT DOCUMENTS

| | | |
|---|---|---|
| 2009/0182562 A1 | 7/2009 | Caire et al. |
| 2015/0255064 A1 | 9/2015 | Fujii et al. |
| 2016/0188574 A1 | 6/2016 | Homma et al. |
| 2017/0154176 A1 | 6/2017 | Yun et al. |
| 2017/0323641 A1 | 11/2017 | Shimizu et al. |

FOREIGN PATENT DOCUMENTS

| | | | |
|---|---|---|---|
| CN | 103474068 A | | 12/2013 |
| CN | 105551492 A | | 5/2016 |
| CN | 106941001 A | * | 7/2017 |
| JP | 2001515611 A | | 9/2001 |

* cited by examiner

*Primary Examiner* — Thierry L Pham
(74) *Attorney, Agent, or Firm* — Knobbe, Martens, Olson & Bear LLP

(57) ABSTRACT

A method and apparatus for controlling a page are provided. A specific embodiment of the method comprises: receiving voice information sent by a terminal and inputted by a user from the terminal, where the terminal is used for displaying a target page and for receiving the voice information in response to receiving a voice control request for the target page from the user; recognizing voice from the voice information to generate text information; analyzing the text information to generate an operation instruction; and sending the operation instruction to the terminal to enable the terminal to execute an operation indicated by the operation instruction on the target page. The embodiment has realized voice-based page control.

10 Claims, 6 Drawing Sheets

METHOD AND APPARATUS FOR CONTROLLING PAGE

CROSS-REFERENCE TO RELATED APPLICATIONS

This application claims priority to Chinese Patent Application No. 201711237766.1, filed on Nov. 30, 2017, titled "Method and Apparatus for Controlling page," which is hereby incorporated by reference in its entirety.

TECHNICAL FIELD

Embodiments of the disclosure relate to the field of computer technology, specifically to the field of Internet technology, and more specifically to a method and apparatus for controlling a page.

BACKGROUND

With the development of science and technology, devices having screens (such as mobile phones, tablet PCs, and smart TVs) have gradually occupied a prominent position in one's life. At present, a device with a screen can display a user requested page to the user, and the user can control the displayed page by touching the screen (such as turning a page, exiting a page, and adjusting page brightness).

SUMMARY

A method and an apparatus for controlling a page are provided according to embodiments of the disclosure.

In a first aspect, a method for controlling a page is provided according to an embodiment of the disclosure. The method includes: receiving voice information sent by a terminal and inputted by a user through the terminal, where the terminal is configured for displaying a target page and for receiving the voice information in response to receiving a voice control request for the target page from the user; performing a speech recognition on the voice information to generate text information; analyzing the text information to generate an operation instruction; and sending the operation instruction to the terminal such that the terminal executes an operation instructed by the operation instruction on the target page.

In some embodiments, the analyzing the text information to generate an operation instruction includes: inputting the text information into a pre-trained deep learning model to obtain the operation instruction, where the deep learning model is used for characterizing a corresponding relationship between the text information and the operation instruction.

In some embodiments, the deep learning model is obtained by following training: acquiring a training sample set, where each training sample in the training sample set includes text information and a preset operation instruction; and obtaining the deep learning model by training using a machine learning method, with the text information of each training sample in the training sample set as an input and the operation instruction as an output.

In some embodiments, the performing a speech recognition on the voice information to generate text information includes: determining whether a preset voice keyword information set includes voice keyword information matching the voice information; acquiring the voice keyword information matching the voice information, in response to determining the preset voice keyword information set including the voice keyword information matching the voice information; and determining preset text keyword information corresponding to the acquired voice keyword information as the text information of the voice information.

In some embodiments, the operation includes at least one of following items: jumping a page, sliding a page, turning a page, or exiting a page.

In a second aspect, an apparatus for controlling a page is provided according to an embodiment of the disclosure. The apparatus includes: a receiving unit, configured for receiving voice information sent by a terminal and inputted by a user through the terminal, where the terminal is configured for displaying a target page and for receiving the voice information in response to receiving a voice control request for the target page from the user; a recognition unit, configured for performing a speech recognition on the voice information to generate text information; an analysis unit, configured for analyzing the text information to generate an operation instruction; and a sending unit, configured for sending the operation instruction to the terminal such that the terminal executes an operation instructed by the operation instruction on the target page.

In some embodiments, the analysis unit includes: an input module, configured for inputting the text information into a pre-trained deep learning model to obtain the operation instruction, where the deep learning model is used for characterizing a corresponding relationship between the text information and the operation instruction.

In some embodiments, the deep learning model is obtained by following training: acquiring a training sample set, where each training sample in the training sample set includes text information and a preset operation instruction; and obtaining the deep learning model by training using a machine learning method, with the text information of each training sample in the training sample set as an input and the operation instruction as an output.

In some embodiments, the recognition unit includes: a first determining module, configured for determining whether a preset voice keyword information set includes voice keyword information matching the voice information; an acquisition module, configured for acquiring the voice keyword information matching the voice information, in response to determining the preset voice keyword information set including the voice keyword information matching the voice information; and a second determining module, configured for determining preset text keyword information corresponding to the acquired voice keyword information as the text information of the voice information.

In some embodiments, the operation includes at least one of following items: jumping a page, sliding a page, turning a page, or exiting a page.

In a third aspect, a server is provided according to an embodiment of the disclosure, including: one or more processors; and a memory for storing one or more programs, where the one or more programs, when executed by the one or more processors, cause the one or more processors to implement the method according to any one embodiment of the method for controlling a page.

In a fourth aspect, a computer readable storage medium storing a computer program is provided according to an embodiment of the disclosure, where the program s, when executed by a processor, cause the processor to implement the method according to any one embodiment of the method for controlling a page.

The method and apparatus for controlling a page according to the embodiments of the disclosure receive voice information sent by a terminal and inputted by a user through the terminal, where the terminal is configured for displaying a target page and for receiving the voice information in response to receiving a voice control request for the target page from the user; then perform a speech recognition on the voice information to generate text information; then analyze the text information to generate an operation instruction; and finally send the operation instruction to the terminal such that the terminal executes an operation instructed by the operation instruction on the target page, thereby realizing page control based on the voice information.

BRIEF DESCRIPTION OF THE DRAWINGS

By reading detailed description on the non-limiting embodiments with reference to the accompanying drawings, other features, objects and advantages of the disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
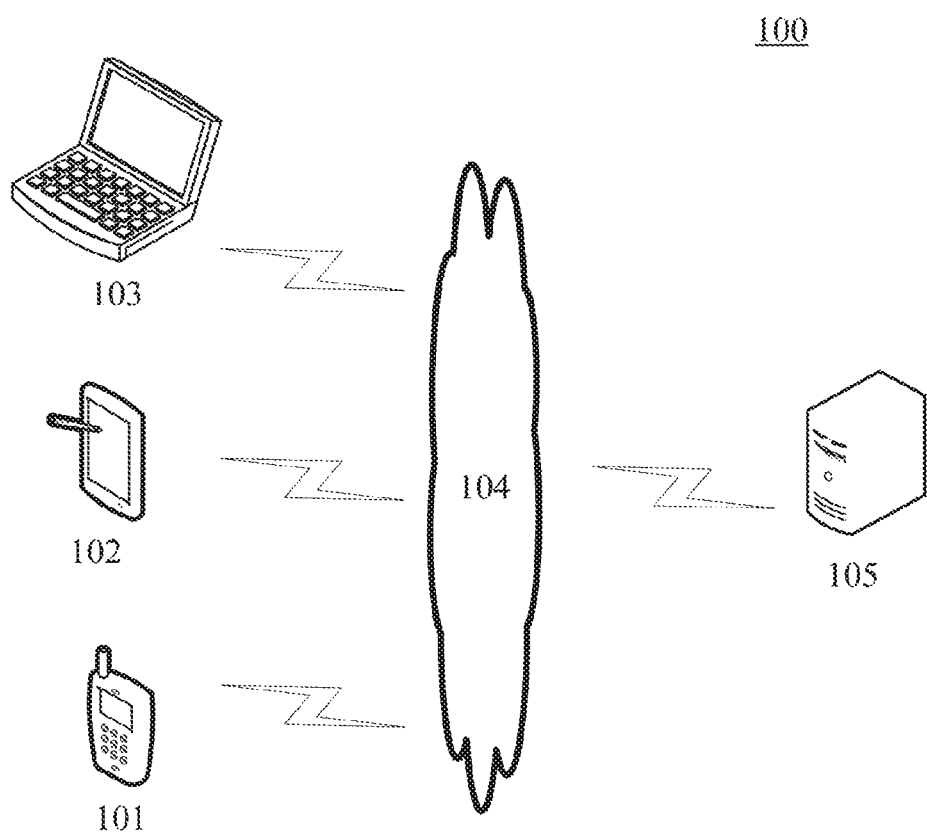
FIG. 1 is an architectural diagram of an system in which some embodiments of the present disclosure may be implemented.

FIG. 1 shows an architecture of a system 100 in which a method for controlling a page or an apparatus for controlling a page according to the embodiments of the present disclosure can be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. Various communication client applications, such as webpage browser applications, e-book reading software, music playing software, instant messaging tools, mailbox clients, and social platform software may be installed on the terminal devices 101, 102 and 103.

The terminal devices 101, 102 and 103 may be various electronic devices having display screens and supporting voice interaction, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a voice processing server processing voice information transmitted by the terminal devices 101, 102, and 103. The voice processing server may perform a corresponding processing such as analysis on data, e.g., received voice information for controlling a page and return a processing result (for example, an operation instruction) to the terminal devices.

It should be noted that the method for controlling a page according to the embodiments of the present disclosure is generally executed by the server 105. Accordingly, the apparatus for controlling a page is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
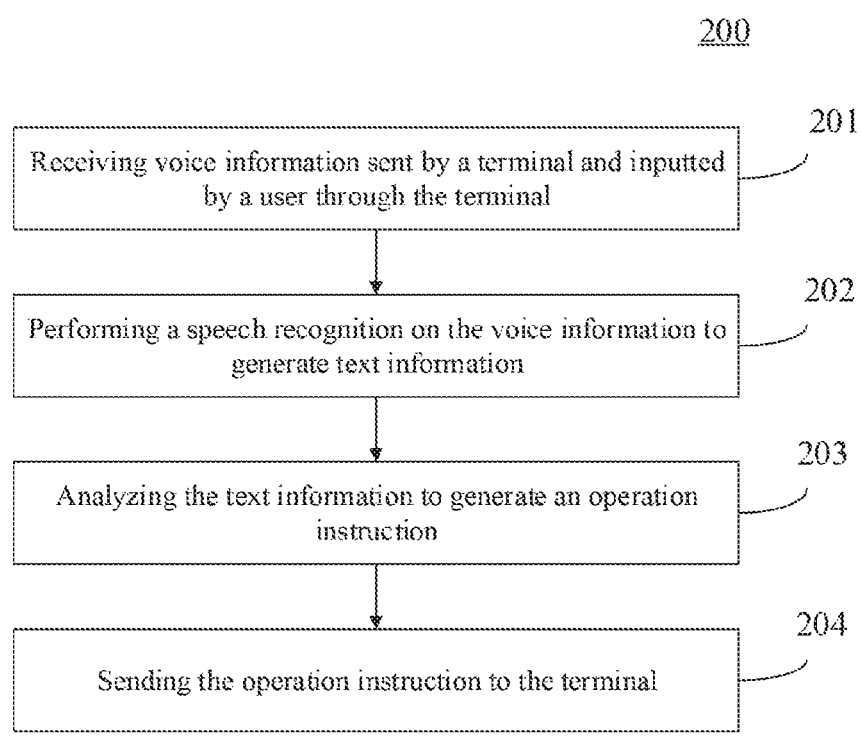
FIG. 2 is a flowchart of a method for controlling a page according to an embodiment of the disclosure.

Reference is made to FIG. 2, which shows a flow 200 of a method for controlling a page according to an embodiment of the disclosure. The method for controlling a page includes steps 201 to 204.

Step 201 includes: receiving voice information sent by a terminal and inputted by a user from the terminal.

In the embodiment, an electronic device (e.g., the server shown in FIG. 1) in which the method for controlling a page is implemented may receive voice information sent by the terminal and inputted by the user through the terminal by wired connection or wireless connection. Here, the terminal is used for displaying a target page and for receiving the voice information in response to receiving a voice control request for the target page from the user.

In the embodiment, the target page may be a page displayed on the terminal and to be controlled by the user. Specifically, the target page may be a web page, a graphical interface, a text user interface or the like. The voice control request may be a user's operation on the target page or on the terminal, such as clicking a voice control button on the target page, or inputting a preset voice control wakeup phrase by speaking. The voice information may be acoustic information of the user inputted by speaking, and corresponds to a content said by the user. The content said by the user may include, but is not limited to, at least one of following items: a word, a phrase, or a sentence. For example, when the user would like to turn the target page to the next page, a content said by the user may be "turning the page to the next page", "page down" or the like.

Step 202 includes: performing a speech recognition on the voice information to generate text information.

In the embodiment, the electronic device (e.g., the server shown in FIG. 1) may perform the speech recognition on the voice information based on the voice information obtained in the step 201 to generate text information. Here, the text information may include, but is not limited to, at least one of following items: a word, a phrase, or a sentence.

In the embodiment, the text information may be used for characterizing a content said by the user. Specifically, the text information may be used for characterizing all or a part of content said by the user. For example, the user inputs voice information, and the said content is "turning the page to the next page". By speech recognition, the generated text information may be "turning the page to the next page", "to the next page", "turning the page" or the like, where the "turning the page to the next page" is all content said by the user, and "to the next page" and "turning the page" are a part of content said by the user.

In some optional implementations of the embodiment, the electronic device may perform the speech recognition to generate text information as follows: the electronic device may firstly determine whether a preset voice keyword information set includes voice keyword information matching the voice information; then acquire the voice keyword information matching the voice information, in response to determining the preset voice keyword information set including the voice keyword information matching the voice information; and finally determine preset text keyword information corresponding to the acquired voice keyword information as the text information of the voice information.

In some optional implementations of the embodiment, the electronic device may further perform the speech recognition on the voice information using a speech recognition technique to generate text information. It should be noted that the speech recognition technique is a well-known technology widely researched and applied at present, and is not repeated any more here.

Step 203 includes: analyzing the text information to generate an operation instruction.

In the embodiment, the electronic device (e.g., the server shown in FIG. 1) may analyze the text information based on the text information obtained in the step 202 to generate the operation instruction. Here, the operation instruction is a recognizable instruction for the terminal, and may be used for instructing the terminal to perform an operation on the target page. As may be appreciated, a plurality of pieces of text information may correspond to one operation instruction. For example, pieces of text information "turning the page to the next page" and "page down" may each correspond to the operation instruction "Control_NextPage".

In some optional implementations of the embodiment, the electronic device may analyze the text information using a natural language processing technique to generate the operation instruction. It should be noted that the natural language processing technique is a well-known technology widely researched and applied at present, and is not repeated any more here.

Step 204 includes: sending the operation instruction to the terminal.

In the embodiment, the electronic device (e.g., the server shown in FIG. 1) may send the operation instruction to the terminal based on the operation instruction obtained in the step 203, so that the terminal perform an operation instructed by the operation instruction on the target page.

As an example, the generated operation instruction is "Control_NextPage". The electronic device may send the operation instruction to the terminal. The terminal may search for a corresponding relationship between a pre-established operation instruction and an operation in response to receiving the operation instruction, and then execute an operation corresponding to the operation instruction on the target page. For example, the operation corresponding to the operation instruction may be "controlling the target page to turn to the next page".

Figure 3:
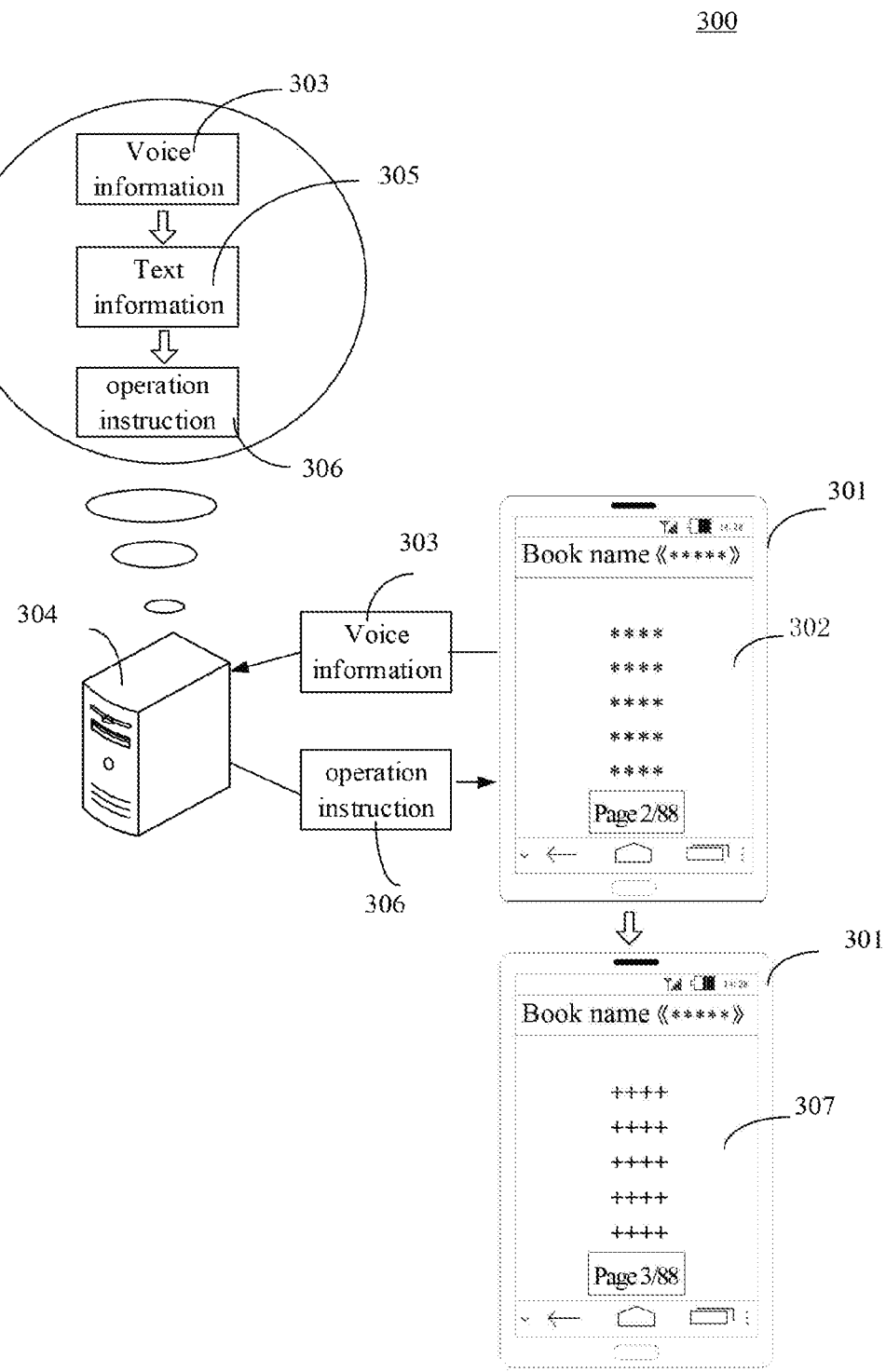
FIG. 3 is a schematic diagram of an application scenario of a method for controlling a page according to some embodiments of the disclosure.

Reference is made to FIG. 3. FIG. 3 is a schematic diagram of an application scenario of a method for controlling a page according to the embodiment. In the application scenario in FIG. 3, a terminal 301 displays a page with a page number "2/88", such as the page of reference numeral 302. If a user would like to control the page displayed by the terminal by voice, the user may send a voice control request (such as a voice wakeup phrase) to the terminal, and then input voice information 303, where the user's expression characterized by the voice information 303 is "page down"; then the terminal receives the voice information 303, and sends the voice information 303 to a voice processing server 304; then the voice processing server 304 performs an speech recognition on the received voice information 303 to generate text information 305; then the voice processing server 304 analyzes the text information 305 to generate an operation instruction 306; and finally, the voice processing server 304 sends the generated operation instruction 306 to the terminal 301, such that the terminal 301 executes an operation instructed by the operation instruction 306. In this case, the page number of the page displayed by the terminal 301 is "3/88", as shown in page of reference numeral 307.

In the method according to the embodiments of the disclosure, voice information sent by a terminal and inputted by a user through the terminal is received, then an speech recognition is performed on the voice information to generate text information, then the text information is analyzed to generate an operation instruction, and finally the operation instruction is sent to the terminal such that the terminal executes an operation instructed by the operation instruction on the target page, thereby realizing page control based on the voice information.

Figure 4:
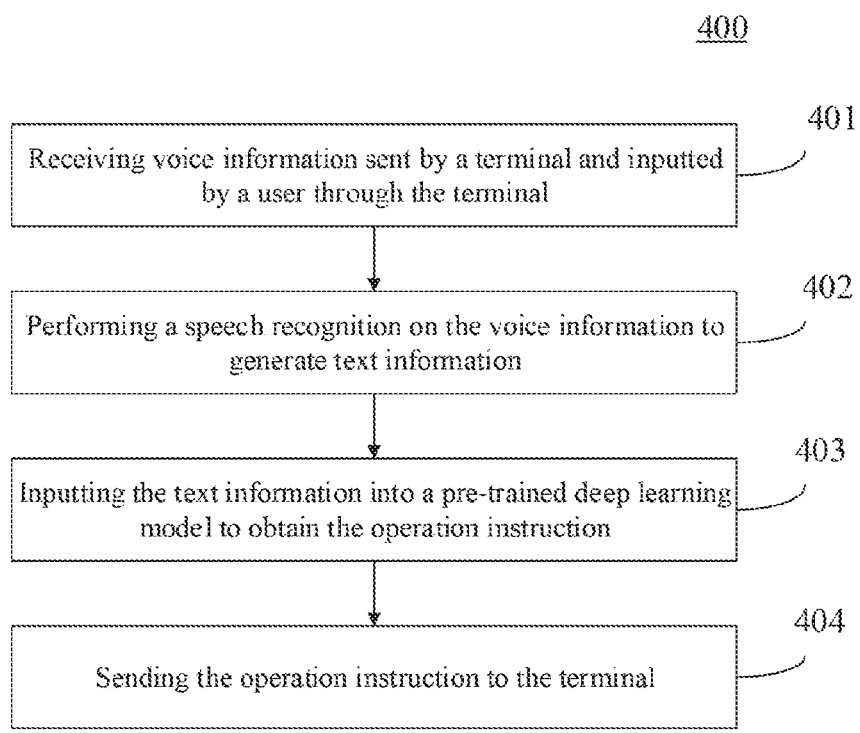
FIG. 4 is a flowchart of a method for controlling a page according to another embodiment of the disclosure.

Reference is made to FIG. 4, which shows a flow 400 of a method for controlling a page according to another embodiment of the disclosure. The flow 400 of the method for controlling a page includes steps 401 to 404.

Step 401 includes: receiving voice information sent by a terminal and inputted by a user through the terminal.

The step 401 in the embodiment is basically consistent with the step 201 in the embodiment corresponding to FIG. 2, and is not repeated any more here.

Step 402 includes: performing a speech recognition on the voice information to generate text information.

The step 402 in the embodiment is basically consistent with the step 202 in the embodiment corresponding to FIG. 2, and is not repeated any more here.

Step 403 includes: inputting the text information into a pre-trained deep learning model to obtain the operation instruction.

In the embodiment, the electronic device (e.g., the server shown in FIG. 1) may input the text information into a pre-trained deep learning model based on the text information obtained in the step 402 to obtain the operation instruction. Here, the deep learning model may be used for characterizing a corresponding relationship between the text information and the operation instruction. As an example, the deep learning model may be a correspondence table pre-established by a skilled person based on a considerable amount of text information and operation instructions and storing a plurality of correspondence relationships between text information and operation instructions; the deep learning model may alternatively be a calculation formula for calculating a matching degree between the text information and the operation instruction, the deep learning model being preset by a skilled person based on a considerable amount of data statistics and being stored in the electronic device. For example, the calculation formula may be a similarity degree calculation formula for calculating a similarity degree between Chinese characters translated from English words in the operation instruction and text information, and the obtained similarity degree calculation result may be used for characterizing whether the calculated text information matches the operation instruction.

In some optional implementations of the embodiments, the deep learning model may be obtained by following training: the electronic device may firstly acquire a training sample set, where each training sample in the training sample set includes text information and a preset operation instruction; and then for each training sample in the training sample set, the electronic device may obtain the deep learning model by training using a machine learning method with the text information as an input and the operation instruction as an output. Specifically, for each training sample set in the training sample set, the electronic device may obtain the deep learning model by training using a machine learning method and a basic model, such as a multi-layer perceptron (MLP) and a convolutional neural network, with the text information as an input and the operation instruction as an output.

It should be noted that the method for training a deep learning model is a well-known technology widely researched and applied at present, and is not repeated any more here.

Step 404 includes: sending the operation instruction to the terminal.

The step 404 in the embodiment is basically consistent with the step 204 in the embodiment corresponding to FIG. 2, and is not repeated any more here.

As can be seen from FIG. 4, compared with the embodiment corresponding to FIG. 2, a flow 400 of a method for controlling a page according to the embodiment highlights analyzing text information using a deep learning model. Therefore, the solution described in the embodiment may be more intelligent and efficient, thereby realizing more flexible page control.

Figure 5:
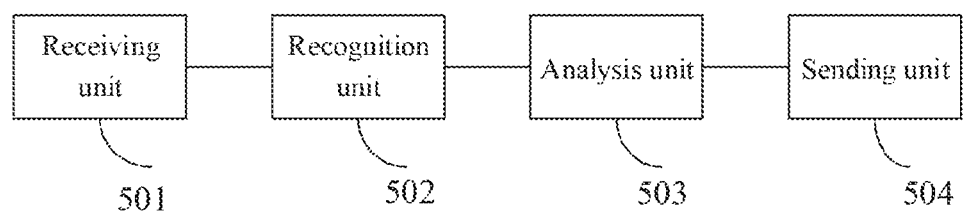
FIG. 5 is a structural schematic diagram of an apparatus for controlling a page according to an embodiment of the disclosure.

Reference is made to FIG. 5. As an implementation of the method shown in the above figures, the disclosure provides an apparatus for controlling a page according to the embodiment. The embodiment of the apparatus corresponds to the embodiment of the method shown in FIG. 2. The apparatus may be specifically applied to a variety of electronic devices.

As shown in FIG. 5, an apparatus 500 for controlling a page according to the embodiment includes: a receiving unit 501, a recognition unit 502, an analysis unit 503 and a sending unit 504. The receiving unit 501 is configured for receiving voice information sent by a terminal and inputted by a user through the terminal, where the terminal is used for displaying a target page and for receiving the voice information in response to receiving a voice control request for the target page from the user; the recognition unit 502 is configured for performing a speech recognition on the voice information to generate text information; the analysis unit 503 is configured for analyzing the text information to generate an operation instruction; and the sending unit 504 is configured for sending the operation instruction to the terminal such that the terminal executes an operation instructed by the operation instruction on the target page.

In the embodiment, the receiving unit 501 of the apparatus 500 for controlling a page may receive voice information sent by the terminal and inputted by the user through the terminal by wired connection or wireless connection. Here, the terminal is used for displaying the target page and for receiving the voice information in response to receiving the voice control request for the target page from the user.

In the embodiment, the target page may be a page displayed on the terminal and to be controlled by the user. Specifically, the target page may be a web page, a graphical interface, a text user interface or the like. The voice control request may be a user's operation on the target page or on the terminal. The voice information may be acoustic information inputted by a user through speaking, and corresponds to a content said by the user. The content said by the user may include, but is not limited to, at least one of following items: a word, a phrase, or a sentence.

In the embodiment, the recognition unit 502 may perform a speech recognition on the voice information based on the voice information obtained by the receiving unit 501 to generate text information. Here, the text information may include, but is not limited to, at least one of following items: a word, a phrase, or a sentence.

In the embodiment, the text information may be used for characterizing the content said by the user. Specifically, the text information may be used for characterizing all or a part of the content said by the user.

In the embodiment, the analysis unit 503 may analyze the text information based on the text information obtained by the recognition unit 502 to generate an operation instruction. Here, the operation instruction is a recognizable instruction for the terminal, and may be used for instructing the terminal to perform an operation on the target page. As may be appreciated, a plurality of pieces of text information may correspond to one operation instruction.

In the embodiment, the sending unit 504 may send the operation instruction to the terminal based on the operation instruction obtained by the analysis unit 503, such that the terminal executes an operation instructed by the operation instruction on the target page.

In some optional implementations of the embodiment, the analysis unit 503 may include: an input module (not shown in the figure), configured for inputting the text information into a pre-trained deep learning model to obtain the operation instruction, where the deep learning model is used for characterizing a corresponding relationship between the text information and the operation instruction.

In some optional implementations of the embodiments, the deep learning model may be obtained by following training: acquiring a training sample set, where each training sample in the training sample set includes text information and a preset operation instruction; and obtaining the deep learning model by training using a machine learning method, with the text information of each training sample in the training sample set as an input and the operation instruction as an output.

In some optional implementations of the embodiment, the recognition unit 502 may include: a first determining module (not shown in the figure), configured for determining whether a preset voice keyword information set includes voice keyword information matching the voice information; an acquisition module (not shown in the figure), configured for acquiring the voice keyword information matching the voice information, in response to determining the preset voice keyword information set including the voice keyword information matching the voice information; and a second determining module (not shown in the figure), configured for determining preset text keyword information corresponding to the acquired voice keyword information as the text information of the voice information.

In some optional implementations of the embodiment, the operation includes at least one of following items: page jump, sliding a page, turning a page, or exiting a page.

The apparatus 500 provided by the embodiments of the disclosure receives voice information sent by a terminal and inputted by a user through the terminal by the receiving unit 501, then performs a speech recognition on the voice information by the recognition unit 502 to generate text information, then analyzes the text information by the analysis unit 503 to generate an operation instruction, and finally sends the operation instruction to the terminal by the sending unit 504 such that the terminal executes an operation instructed by the operation instruction on the target page, thereby realizing voice-based page control.

Figure 6:
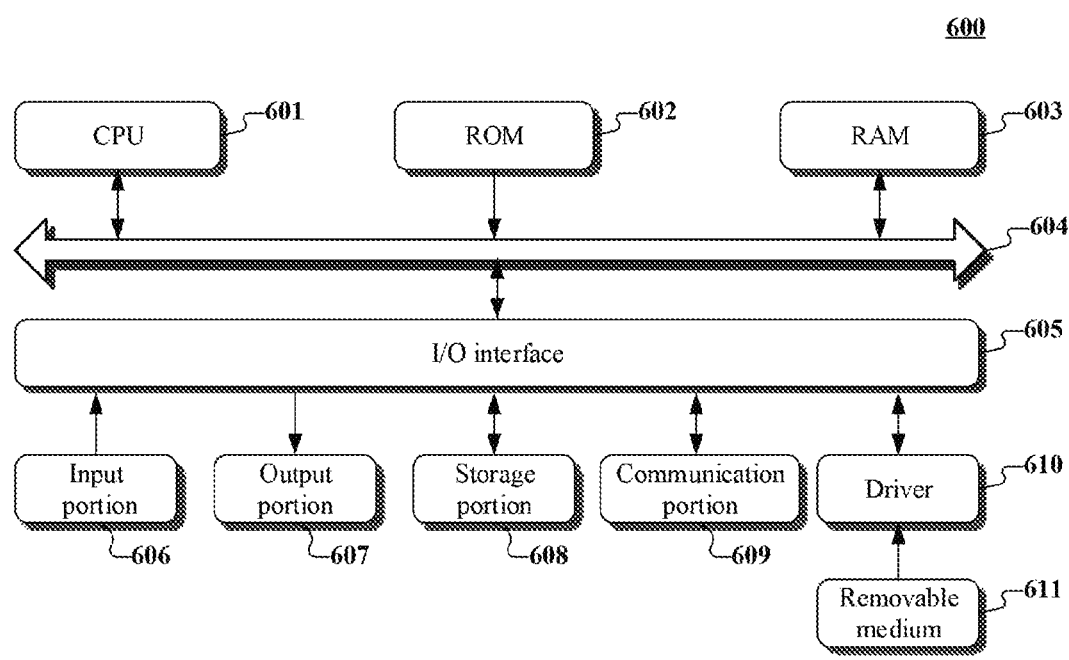
FIG. 6 is a structural schematic diagram of a computer system adapted to implement a server according to an embodiment of the disclosure.

Referring to FIG. 6, a schematic structural diagram of a computer system 600 adapted to implement a server of the embodiments of the present disclosure is shown. The server shown in FIG. 6 is only an example, and is not a limitation of the function and the scope of the embodiment of the disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 including a cathode ray tube (CRT), a liquid crystal display device (LCD), a speaker etc.; a storage portion 608 including a hard disk and the like; and a communication portion X09 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of some embodiments of the present disclosure. It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a receiving unit, a recognition unit, an analysis unit and a sending unit, where the names of these units or modules do not in some cases constitute a limitation to such units themselves. For example, the receiving unit may also be described as "a unit for receiving voice information."

In another aspect, some embodiments of the present disclosure further provide a computer-readable medium. The computer-readable medium may be the computer-readable medium included in the apparatus in the above described embodiments, or a stand-alone computer-readable medium not assembled into the apparatus. The computer-readable medium stores one or more programs. The one or more programs, when executed by a device, cause the device to: receive voice information sent by a terminal and inputted by a user through the terminal, the terminal being configured for displaying a target page and for receiving the voice information in response to receiving a voice control request for the target page from the user; perform a speech recognition on the voice information to generate text information;

analyzing the text information to generate an operation instruction; send the operation instruction to the terminal such that the terminal executes an operation instructed by the operation instruction on the target page.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for controlling a page, comprising:
    receiving voice information sent by a terminal and inputted by a user through the terminal, the terminal being configured for displaying a target page and for receiving the voice information in response to receiving a voice control request for the target page from the user;
    performing a speech recognition on the voice information to generate text information;
    analyzing the text information to generate an operation instruction; and
    sending the operation instruction to the terminal such that the terminal executes an operation instructed by the operation instruction on the target page,
    wherein analyzing the text information to generate the operation instruction comprises:
    inputting the text information into a pre-trained deep learning model to obtain the operation instruction, wherein the deep learning model is a similarity degree calculation formula, the similarity degree calculation formula being configured to calculate a similarity degree between a character of a first language translated from words of a second language in the operation instruction, and the text information, and
    wherein the method is performed by at least one processor.

2. The method according to claim 1, wherein the deep learning model is obtained by following training:
    acquiring a training sample set, wherein each training sample in the training sample set includes text information and a preset operation instruction; and
    obtaining the deep learning model by training using a machine learning method, with the text information of the each training sample in the training sample set as an input and the operation instruction as an output.

3. The method according to claim 1, wherein the performing a speech recognition on the voice information to generate text information comprises:
    determining whether a preset voice keyword information set includes voice keyword information matching the voice information;
    acquiring the voice keyword information matching the voice information, in response to determining the preset voice keyword information set including the voice keyword information matching the voice information; and
    determining preset text keyword information corresponding to the acquired voice keyword information as the text information of the voice information.

4. The method according to claim 1, wherein the operation comprises at least one of following items:
    jumping a page, sliding a page, turning a page, or exiting a page.

5. An apparatus for controlling a page, comprising:
    at least one processor; and
    a memory storing instructions, the instructions when executed by the at least one processor, cause the at least one processor to perform operations, the operations comprising:
    receiving voice information sent by a terminal and inputted by a user through the terminal, the terminal being configured for displaying a target page and for receiving the voice information in response to receiving a voice control request for the target page from the user;
    performing a speech recognition on the voice information to generate text information;
    analyzing the text information to generate an operation instruction; and
    sending the operation instruction to the terminal such that the terminal executes an operation instructed by the operation instruction on the target page,
    wherein analyzing the text information to generate the operation instruction comprises:
    inputting the text information into a pre-trained deep learning model to obtain the operation instruction, wherein the deep learning model is a similarity degree calculation formula, the similarity degree calculation formula being configured to calculate a similarity degree between a character of a first language translated from words of a second language in the operation instruction, and the text information.

6. The apparatus according to claim 5, wherein the deep learning model is obtained by following training:
    acquiring a training sample set, wherein each training sample in the training sample set includes text information and a preset operation instruction; and
    obtaining the deep learning model by training using a machine learning method, with the text information of the each training sample in the training sample set as an input and the operation instruction as an output.

7. The apparatus according to claim 5, wherein the performing a speech recognition on the voice information to generate text information comprises:
    determining whether a preset voice keyword information set includes voice keyword information matching the voice information;
    acquiring the voice keyword information matching the voice information, in response to determining the preset voice keyword information set including the voice keyword information matching the voice information; and
    determining preset text keyword information corresponding to the acquired voice keyword information as the text information of the voice information.

8. The apparatus according to claim 5, wherein the operation comprises at least one of following items:
    jumping a page, sliding a page, turning a page, or exiting a page.

9. A non-transitory computer storage medium, storing a computer program, wherein the program, when executed by a processor, causes the processor to perform operations, the operations comprising:
    receiving voice information sent by a terminal and inputted by a user through the terminal, the terminal being configured for displaying a target page and for receiving the voice information in response to receiving a voice control request for the target page from the user;
performing a speech recognition on the voice information to generate text information;
analyzing the text information to generate an operation instruction; and
sending the operation instruction to the terminal such that the terminal executes an operation instructed by the operation instruction on the target page,
wherein analyzing the text information to generate the operation instruction comprises:
inputting the text information into a pre-trained deep learning model to obtain the operation instruction, wherein the deep learning model is a similarity degree calculation formula, the similarity degree calculation formula being configured to calculate a similarity degree between a character of a first language translated from words of a second language in the operation instruction, and the text information.

10. The method according to claim 1, wherein the first language is Chinese and the second language is English.

\* \* \* \* \*

UNITED STATES PATENT AND TRADEMARK OFFICE
CERTIFICATE OF CORRECTION

PATENT NO. : 11,164,573 B2  
APPLICATION NO. : 16/133344  
DATED : November 2, 2021  
INVENTOR(S) : Wenyu Wang It is certified that error appears in the above-identified patent and that said Letters Patent is hereby corrected as shown below:

On the Title Page

Item [73], delete "Baidu Online Network Technology (Beijing) Co., Ltd., Beijing (CN)" and insert --Baidu Online Network Technology (Beijing) Co., Ltd., Beijing (CN); Shanghai Xiaodu Technology Co., Ltd.--.

Signed and Sealed this  
Thirtieth Day of May, 2023

Katherine Kelly Vidal  
*Director of the United States Patent and Trademark Office*